US008937772B1

(12) United States Patent
Burns et al.

(10) Patent No.: US 8,937,772 B1
(45) Date of Patent: Jan. 20, 2015

(54) SYSTEM FOR AND METHOD OF STOWING HUD COMBINERS

(75) Inventors: Lincoln J. Burns, Portland, OR (US);
John N. Richards, Hillsboro, OR (US);
David L. Wallace, West Linn, OR (US);
John R. Howell, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 217 days.

(21) Appl. No.: 13/250,970

(22) Filed: Sep. 30, 2011

(51) Int. Cl.
*G02B 27/14* (2006.01)
*G02B 27/01* (2006.01)

(52) U.S. Cl.
CPC ........... *G02B 27/0172* (2013.01); *Y10S 359/90* (2013.01)
USPC .......................................... 359/632; 359/900

(58) Field of Classification Search
USPC .......................................... 359/630, 632, 900
See application file for complete search history.

(56) References Cited

U.S. PATENT DOCUMENTS

| 2,141,884 | A | 12/1938 | Sonnefeld |
| 4,082,432 | A | 4/1978 | Kirschner |
| 4,178,074 | A | 12/1979 | Heller |
| 4,218,111 | A | 8/1980 | Withrington et al. |
| 4,232,943 | A | 11/1980 | Rogers |
| 4,309,070 | A | 1/1982 | St. Leger Searle |
| 4,647,967 | A | 3/1987 | Kirschner et al. |
| 4,711,512 | A | 12/1987 | Upatnieks |
| 4,714,320 | A | 12/1987 | Banbury |
| 4,775,218 | A | 10/1988 | Wood et al. |
| 5,079,416 | A | 1/1992 | Filipovich |
| 5,218,360 | A | 6/1993 | Goetz et al. |
| 5,341,230 | A | 8/1994 | Smith |
| 5,369,511 | A | 11/1994 | Amos |
| 5,408,346 | A | 4/1995 | Trissel et al. |
| 5,524,272 | A | 6/1996 | Podowski et al. |
| 5,668,907 | A | 9/1997 | Veligdan |
| 5,727,098 | A | 3/1998 | Jacobson |
| 5,856,842 | A | 1/1999 | Tedesco |
| 5,892,598 | A | 4/1999 | Asakawa et al. |
| 5,903,395 | A | 5/1999 | Rallison et al. |
| 6,169,613 | B1 | 1/2001 | Amitai et al. |
| 6,176,837 | B1 | 1/2001 | Foxlin |
| 6,333,819 | B1 | 12/2001 | Svedenkrans |

(Continued)

FOREIGN PATENT DOCUMENTS

| WO | WO-99/52002 | 10/1999 |
| WO | WO-2010/067117 | 6/2010 |
| WO | WO-2011/012825 | 2/2011 |

OTHER PUBLICATIONS

Cameron, A., The Application of Holographic Optical Waveguide Technology to Q-Sight™ Family of Helmet Mounted Displays, Proc. of SPIE, 2009, 11 pages, vol. 7326.

(Continued)

*Primary Examiner* — Jack Dinh
(74) *Attorney, Agent, or Firm* — Angel N. Gerdzhikov; Donna P. Suchy; Daniel M. Barbieri

(57) ABSTRACT

A stow mechanism for head up display includes a bracket for attachment to an environment associated with the head up display. The stow mechanism can also include a combiner arm rotatably attached to the bracket. The combiner arm rotates in at last two degrees of freedom as the combiner arm is rotated with respect to the bracket from an operational position to a stow position.

20 Claims, 6 Drawing Sheets

(56) References Cited

U.S. PATENT DOCUMENTS

| | | |
|---|---|---|
| 6,392,812 B1 | 5/2002 | Howard |
| 6,409,687 B1 | 6/2002 | Foxlin |
| 6,550,949 B1 | 4/2003 | Bauer et al. |
| 6,646,810 B2 | 11/2003 | Harter et al. |
| 6,757,105 B2 | 6/2004 | Niv et al. |
| 6,829,095 B2 | 12/2004 | Amitai |
| 6,847,488 B2 | 1/2005 | Travis |
| 7,021,777 B2 | 4/2006 | Amitai |
| 7,027,671 B2 | 4/2006 | Huck et al. |
| 7,101,048 B2 | 9/2006 | Travis |
| 7,123,418 B2 | 10/2006 | Weber et al. |
| 7,181,108 B2 | 2/2007 | Levola |
| 7,199,934 B2 | 4/2007 | Yamasaki |
| 7,205,960 B2 | 4/2007 | David |
| 7,259,906 B1 | 8/2007 | Islam |
| 7,319,573 B2 | 1/2008 | Nishiyama |
| 7,391,573 B2 | 6/2008 | Amitai |
| 7,395,181 B2 | 7/2008 | Foxlin |
| 7,411,637 B2 | 8/2008 | Weiss |
| 7,433,116 B1 | 10/2008 | Islam |
| 7,436,568 B1 | 10/2008 | Kuykendall, Jr. |
| 7,457,040 B2 | 11/2008 | Amitai |
| 7,573,640 B2 | 8/2009 | Nivon et al. |
| 7,576,916 B2 | 8/2009 | Amitai |
| 7,577,326 B2 | 8/2009 | Amitai |
| 7,593,575 B2 | 9/2009 | Houle et al. |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,864,427 B2 | 1/2011 | Korenaga et al. |
| 7,884,985 B2 | 2/2011 | Amitai et al. |
| 7,907,342 B2 | 3/2011 | Simmonds et al. |
| 8,004,765 B2 | 8/2011 | Amitai |
| RE42,992 E | 12/2011 | David |
| 8,089,568 B1 | 1/2012 | Brown et al. |
| 8,189,263 B1 | 5/2012 | Wang et al. |
| 8,213,065 B2 | 7/2012 | Mukawa |
| 8,233,204 B1 | 7/2012 | Robbins et al. |
| 8,398,242 B2 | 3/2013 | Yamamoto et al. |
| 8,403,490 B2 | 3/2013 | Sugiyama et al. |
| 8,654,420 B2 | 2/2014 | Simmonds |
| 2003/0063042 A1 | 4/2003 | Friesem et al. |
| 2006/0132914 A1 | 6/2006 | Weiss et al. |
| 2006/0228073 A1 | 10/2006 | Mukawa et al. |
| 2006/0279662 A1 | 12/2006 | Kapellner et al. |
| 2007/0019297 A1 | 1/2007 | Stewart et al. |
| 2008/0043334 A1 | 2/2008 | Itzkovitch et al. |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0019222 A1 | 1/2009 | Verma et al. |
| 2009/0052046 A1 | 2/2009 | Amitai |
| 2009/0052047 A1 | 2/2009 | Amitai |
| 2009/0097122 A1 | 4/2009 | Niv |
| 2009/0097127 A1 | 4/2009 | Amitai |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0237804 A1 | 9/2009 | Amitai et al. |
| 2010/0060551 A1 | 3/2010 | Sugiyama et al. |
| 2010/0171680 A1 | 7/2010 | Lapidot et al. |
| 2010/0177388 A1 | 7/2010 | Cohen et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2011/0026128 A1 | 2/2011 | Baker et al. |
| 2011/0050548 A1 | 3/2011 | Blumenfeld et al. |
| 2011/0211239 A1 | 9/2011 | Mukawa et al. |
| 2011/0242670 A1 | 10/2011 | Simmonds |
| 2012/0120493 A1 | 5/2012 | Simmonds et al. |
| 2012/0127577 A1 | 5/2012 | Desserouer |
| 2012/0235900 A1 | 9/2012 | Border et al. |
| 2012/0280956 A1 | 11/2012 | Yamamoto et al. |

OTHER PUBLICATIONS

Wisely, P.L., Head up and head mounted display performance improvements through advanced techniques in the manipulation of light, Proc. of SPIE, 2009, 10 pages, vol. 7327.

Office Action for U.S. Appl. No. 13/250,621, mail date May 21, 2013, 10 pages.

Office Action for U.S. Appl. No. 13/250,940, mail date Aug. 28, 2013, 15 pages.

Office Action for U.S. Appl. No. 13/250,940, mail date Mar. 12, 2013, 11 pages.

Office Action for U.S. Appl. No. 13/250,994, mail date Sep. 16, 2013, 11 pages.

Ayras et al., Exit Pupil Expander with a Large Field of View Based on Diffractive Optics, Journal of the SID, 2009, 6 pages.

Notice of Allowance for U.S. Appl. No. 12/700,557, mail date Oct. 22, 2013, 9 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action for U.S. Appl. No. 13/250,858 Dated Feb. 19, 2014, 13 page.

Office Action for U.S. Appl. No. 13/250,858, mail date Oct. 28, 2013, 9 pages.

Office Action on U.S. Appl. No. 13/250,940 Dated Mar. 25, 2014, 12 pages.

Office Action on U.S. Appl. No. 13/251,087 Dated Mar. 28, 2014, 12 pages.

Non-Final Office Action on U.S. Appl. No. 13/250,858 Dated Sep. 15, 2014, 16 pages.

Notice of Allowance on U.S. Appl. No. 13/251,087 Dated Jul. 17, 2014, 8 pages.

SYSTEM FOR AND METHOD OF STOWING HUD COMBINERS

CROSS REFERENCE TO RELATED APPLICATIONS

The present application is related to: U.S. patent application Ser. No. 13/250,940, entitled, "Head Up Display (HUD) Utilizing Diffractive Gratings Having Optimized Efficiency," filed on an even date herewith, incorporated herein by reference, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on an even date herewith, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on an even date herewith, incorporated herein by reference in its entirety, and assigned to the assignee of the present application; U.S. patent application Ser. No. 13/250,994, entitled, "Compact Head Up Display (HUD) for Cockpits with Constrained Space Envelopes," filed on an even date herewith, incorporated herein by reference in its entirety, and assigned to the assignee of the present application; and U.S. patent application Ser. No. 13/250,621, entitled, "System for and Method of Catadioptric Collimation in a Compact Head Up Display (HUD)," filed on an even date herewith, incorporated herein by reference herein in its entirety and assigned to the assignee of the present application.

BACKGROUND OF THE INVENTION

The present specification relates to displays. More particularly, the present specification relates to head up displays (HUDs) including stow mechanisms.

Conventional HUDs are generally large, expensive and difficult to fit into small airplanes. Often, conventional HUDs rely on large lenses to form adequate field of view and viewing eye box. Compact HUDs are needed for small business jets and other aircraft where space is constrained in the cockpit.

Substrate guided HUDs have been proposed which use wave guide technology with diffraction gratings to preserve eye box size while reducing lens size. However, even though substrate guided HUDs are smaller than conventional HUDs, they are still difficult to stow in small cockpits. Conventional stow paths generally only rotate through a single axis and swing through areas for the pilot's head or stop too close to the pilot's head. Further, conventional stow mechanisms are expensive and bulky.

Therefore, there is a need for a compact HUD for small aircraft, such as small business jets. Further, there is a need for a compact HUD which reduces stowage and break-away issues. Yet further, there is a need for a HUD that allows easy ingress/egress. Yet further still, there is also a need for a lightweight, lower cost, smaller sized stow mechanism of a HUD. Yet further, there is a need for a stow mechanism and method optimized for use with a substrate waveguide HUD.

SUMMARY OF THE INVENTION

An exemplary embodiment relates to a stow mechanism for head up display. The stow mechanism includes a bracket for attachment to an environment associated with the head up display. The stow mechanism can also include a combiner arm rotatably attached to the bracket. The combiner arm rotates in at last two degrees of freedom as the combiner arm is rotated with respect to the bracket from an operational position to a stow position.

Another exemplary embodiment relates to a method of stowing a HUD. The method includes rotating a combiner associated with the HUD from an operational position to a first position. The method also includes rotating the combiner associated with the HUD from the first position to the stow position. The combiner travels through at least two degrees of freedom as it is rotated from the operational position to the stow position. The combiner can be rotated through the first position without stopping or can stop at the first position.

Another exemplary embodiment relates to a head up display including an image source, and a waveguide. The waveguide is attached to a combiner arm which is attached to a fixed bracket through a single shaft. The mechanism uses a wedge and spherical bearing between the combiner arm and bracket to achieve multiple rotational degrees of freedom.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
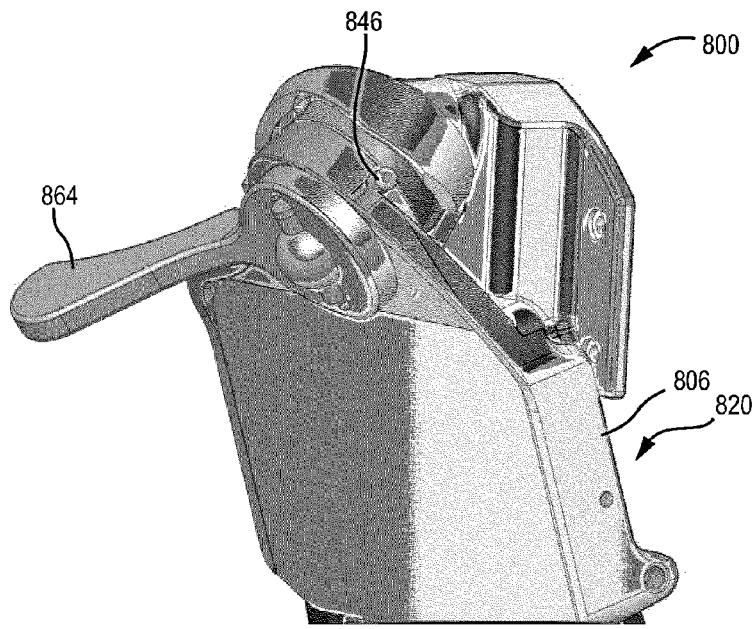
FIG. 1 is a perspective view schematic drawing of a stow mechanism for use with a HUD system in accordance with another exemplary embodiment.
Figure 2:
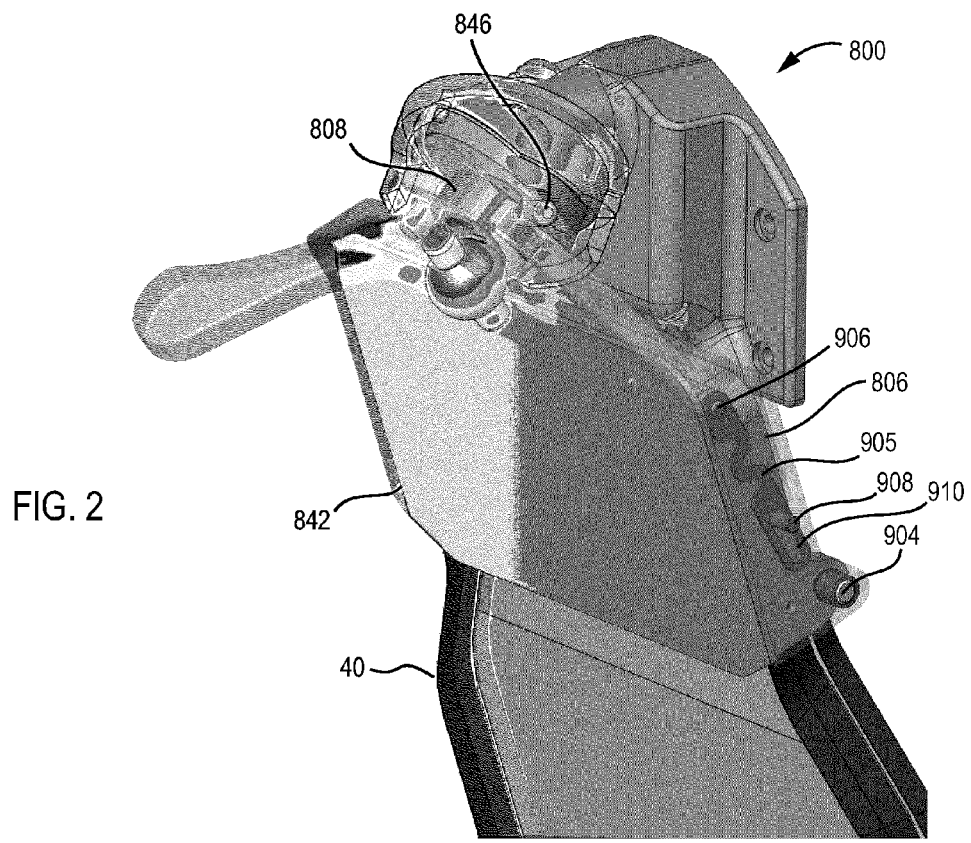
FIG. 2 is a perspective partial cut away view schematic drawing of the stow mechanism illustrated in FIG. 1 showing a spherical bearing in accordance with another exemplary embodiment.

Before describing in detail the particular improved system and method, it should be observed that the invention includes, but is not limited to, a novel structural combination of optical, and mechanical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 3:
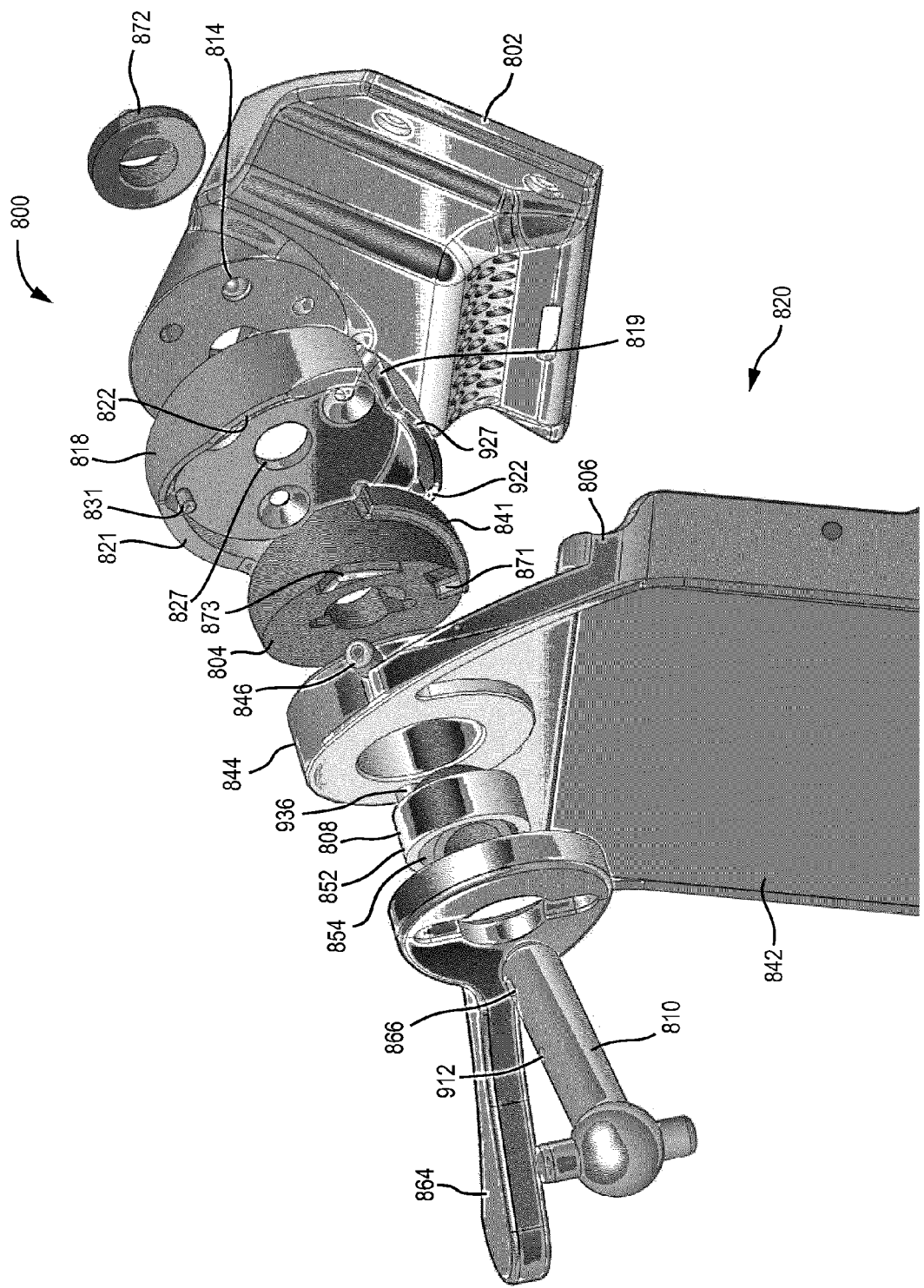
FIG. 3 is an expanded perspective view schematic drawing of the stow mechanism illustrated in FIG. 1.
Figure 4:
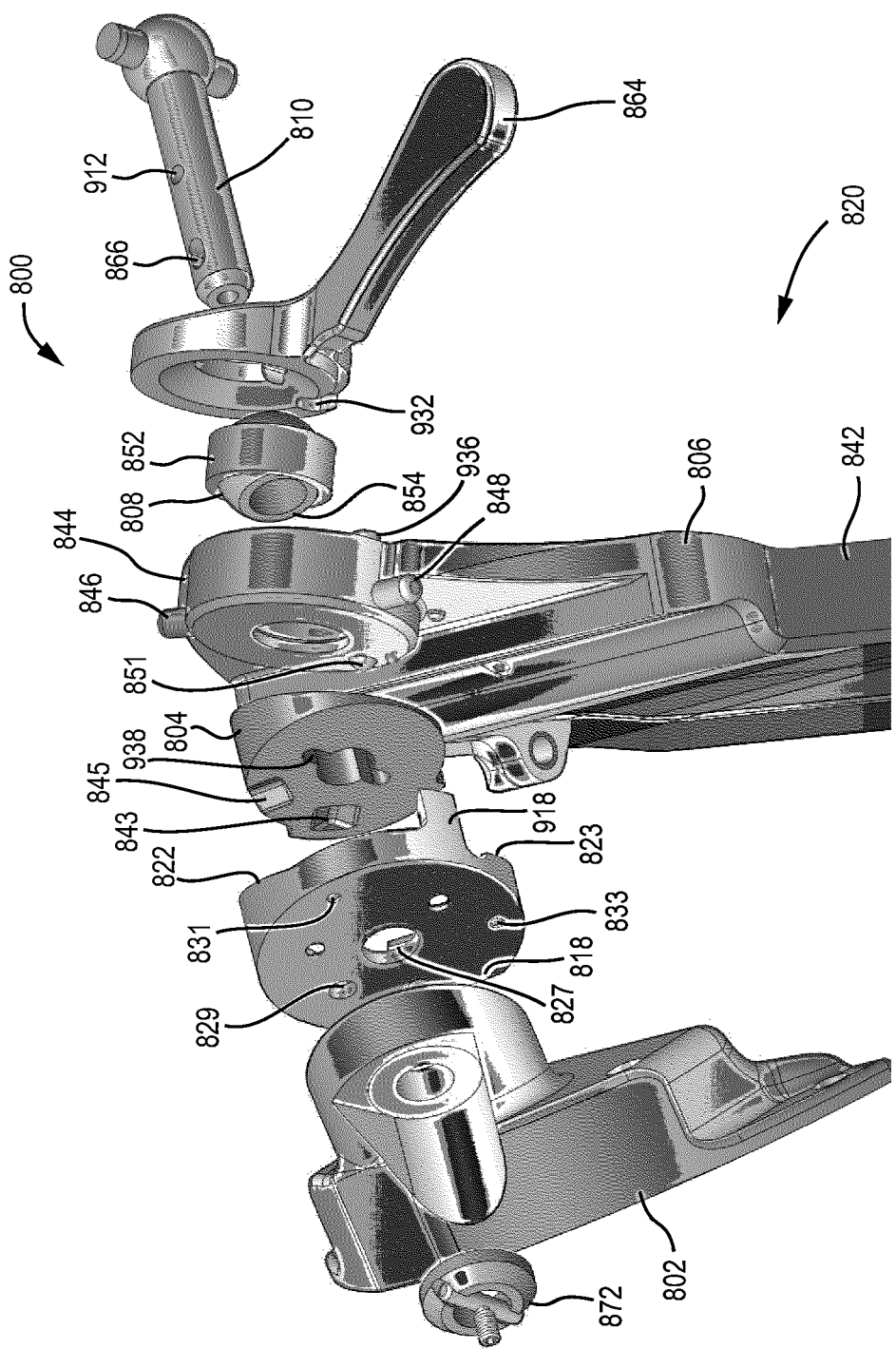
FIG. 4 is another expanded perspective view schematic drawing of the stow mechanism illustrated in FIG. 1.
Figure 5:
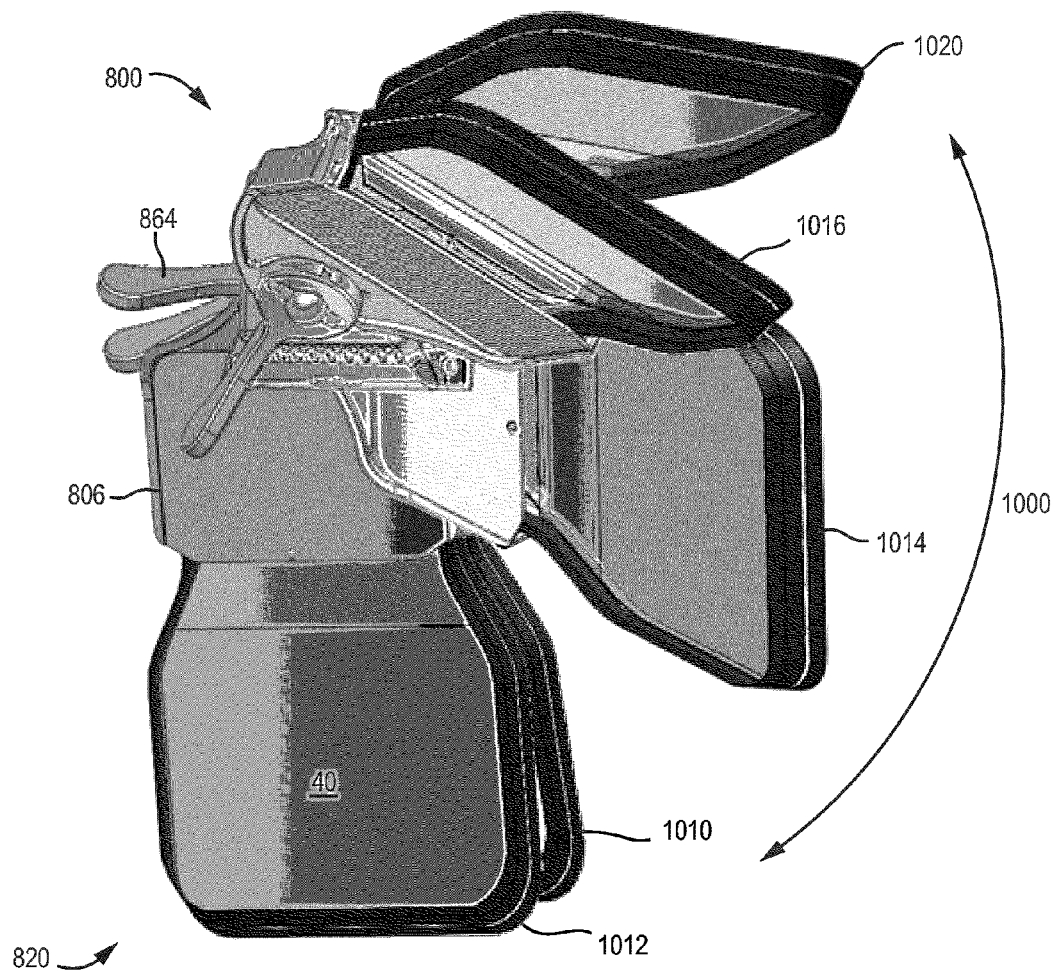
FIG. 5 is a perspective view schematic drawing of the stow mechanism illustrated in FIG. 1 in five positions across a stow path in accordance with another exemplary embodiment.

With reference to FIGS. 1-5, a HUD system can be packaged as a compact HUD system 820 (FIG. 5). HUD system 820 can be attached to a stow mechanism 800. The specific shape and structure of system 820 is not shown in a limiting fashion. Stow mechanism 800 can be used with other line replaceable units (LRUs) as well as other types of HUDs.

Stow mechanism 800 advantageously operates across a stow path 1000 (FIG. 5) that encompasses more than one degree of freedom to accommodate constrained envelopes associated with smaller cockpits. Substrate waveguide 40 rotates over two or more axes as it travels to and from an operational position 1010 and stow position 1020 in stow path 1000. In operational position 1010, waveguide 40 is preferably deployed for HUD operations and is properly aligned with the collimating optics.

Unlike conventional designs which provide rotation of the HUD combiner about a single axis, stow mechanism 800 allows HUD system 820 to have stow path 1000 that avoids a pilot's head in small cockpit environments and yet is not too bulky or expensive according to one embodiment. In a preferred embodiment, stow path 1000 does not pass through a head location of the pilot and can be operated by the pilot with one hand.

With reference to FIGS. 3 and 4, stow mechanism 800 includes a bracket 802, a wedge 804, a combiner arm 806, a spherical bearing 808, and a shaft 810. Substrate waveguide 40 (FIG. 5) is preferably contained in combiner receiver 842 mounted inside a combiner arm 806. Collimating optics and an image source can be housed in a portion of a housing (not shown) located behind bracket 802.

Bracket 802 is configured for attachment to the collimating optics housing (not shown). Bracket 802 includes a cam 818 with a rim 822 having a stow recess 819, a recess 821, and an operational recess 823. Rim 822 also include a tab 918.

Cam 818 has an aperture 827 for receiving shaft 810 and an aperture 829 through which a spring loaded ball bearing 814 on bracket 802 protrudes. Cam 818 also included posts 831 and 833 (FIG. 4). Cam 818 is preferably attached by fasteners to bracket 802 and can be metal material.

Wedge 804 is received in cam 818 of bracket 802. Wedge 804 is cylindrical and has height that is greater on one side than the opposite side. Wedge 804 includes a tab 841 that slides within cam 818 and engages post 831 when turned counter clockwise and post 833 when turned clockwise. Wedge 804 includes an operational detent 871 and a stow dent 873 on a side facing combiner arm 806 and detent 843 and a detent 845 on a side facing cam 818. Detents 843 and 845 engage bearing 814 as explained below.

Combiner arm 806 includes a receiver 842 for attachment to waveguide 40 and a collar portion 844. Collar portion 844 includes pin members 846, 848 and 936. Collar portion 844 sits on top of wedge 804 and includes a spring loaded ball bearing 851. Combiner arm 806 holds waveguide 40 optically aligned with and at a gap from a lens when in an operational position 1010 (FIGS. 5 and 6) in one embodiment. HUD system 820 advantageously does not require as accurate of alignment of the image source to waveguide 40, thereby allowing less critical tolerances for stow mechanism 800.

Figure 6:
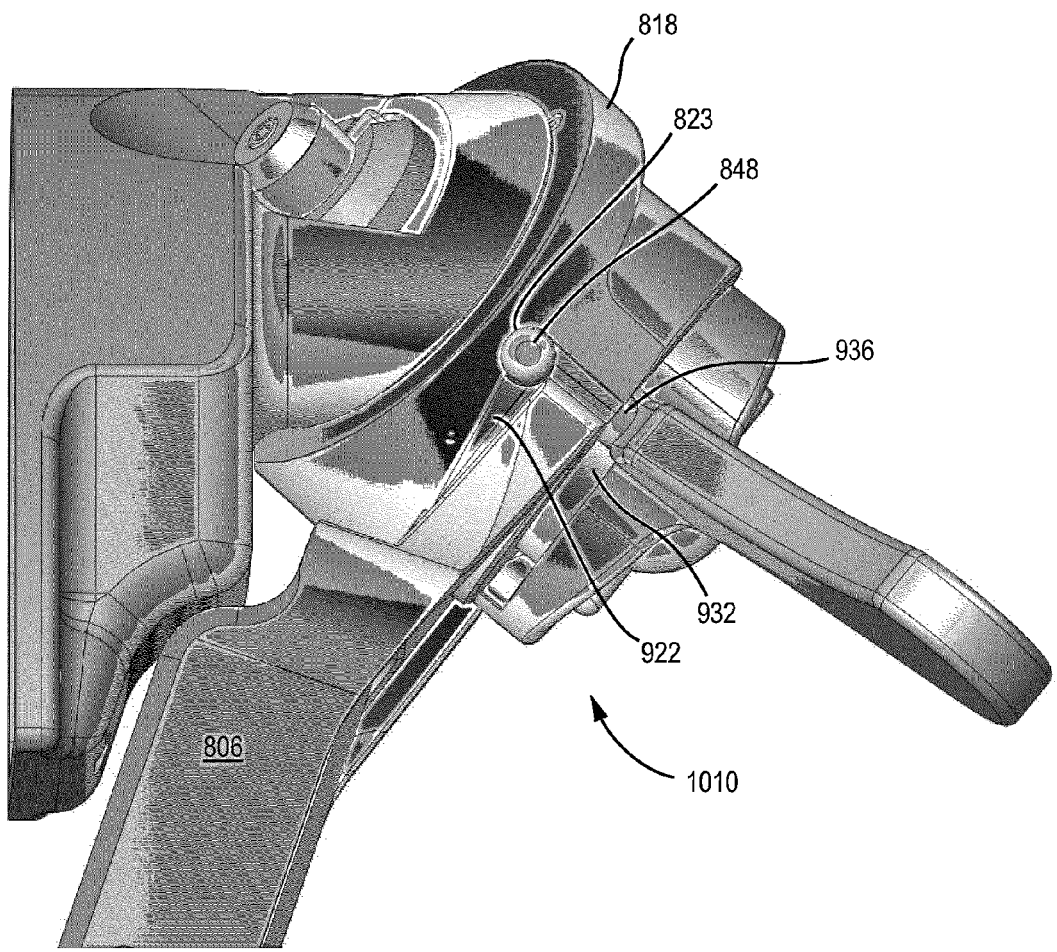
FIG. 6 is another perspective view schematic drawing showing the stow mechanism illustrated in FIG. 1 in an operational position in accordance with another exemplary embodiment.

Shaft 810 can be integrated with or attached to a handle 864. Handle 864 includes a recessed groove 932 configured to receive a pin 936 on combiner arm 806. Pin 848 locks combiner arm 806 into recess 823 of cam 818 (FIG. 6) when mechanism is in operational position 1010 (FIG. 6). Shaft 810 is disposed through spherical bearing 808, collar portion 844, wedge 804, cam 818, and into bracket 802. A shaft retaining ring 872 locks shaft 810 to bracket 802 at an aperture 866. Shaft 810 is rotatable within aperture 827 of cam 818 but is held at a fixed angle within bracket 802. Shaft 810 is fixed to wedge 804 via a pin (not shown) sitting in aperture 938 (FIG. 4) of wedge 804 and extending through aperture 912 of shaft 810.

Bearing 802 includes an outer collar 852 aligned with collar portion 844 of combiner arm 806 and an inner collar 854 aligned with shaft portion 810. Collar bearing 802 allows combiner arm 806 to move in more than one degree of freedom with respect to shaft 810.

In operation, stow mechanism 800 allows substrate waveguide 40 to change attitude in three rotational degrees of freedom about shaft 810. Spherical bearing 808 allows collar portion 844 to rotate in three degrees of motion with respect to shaft portion 810 and bracket 802 due to the movement of collar 852 with respect to collar 854.

Figure 7:
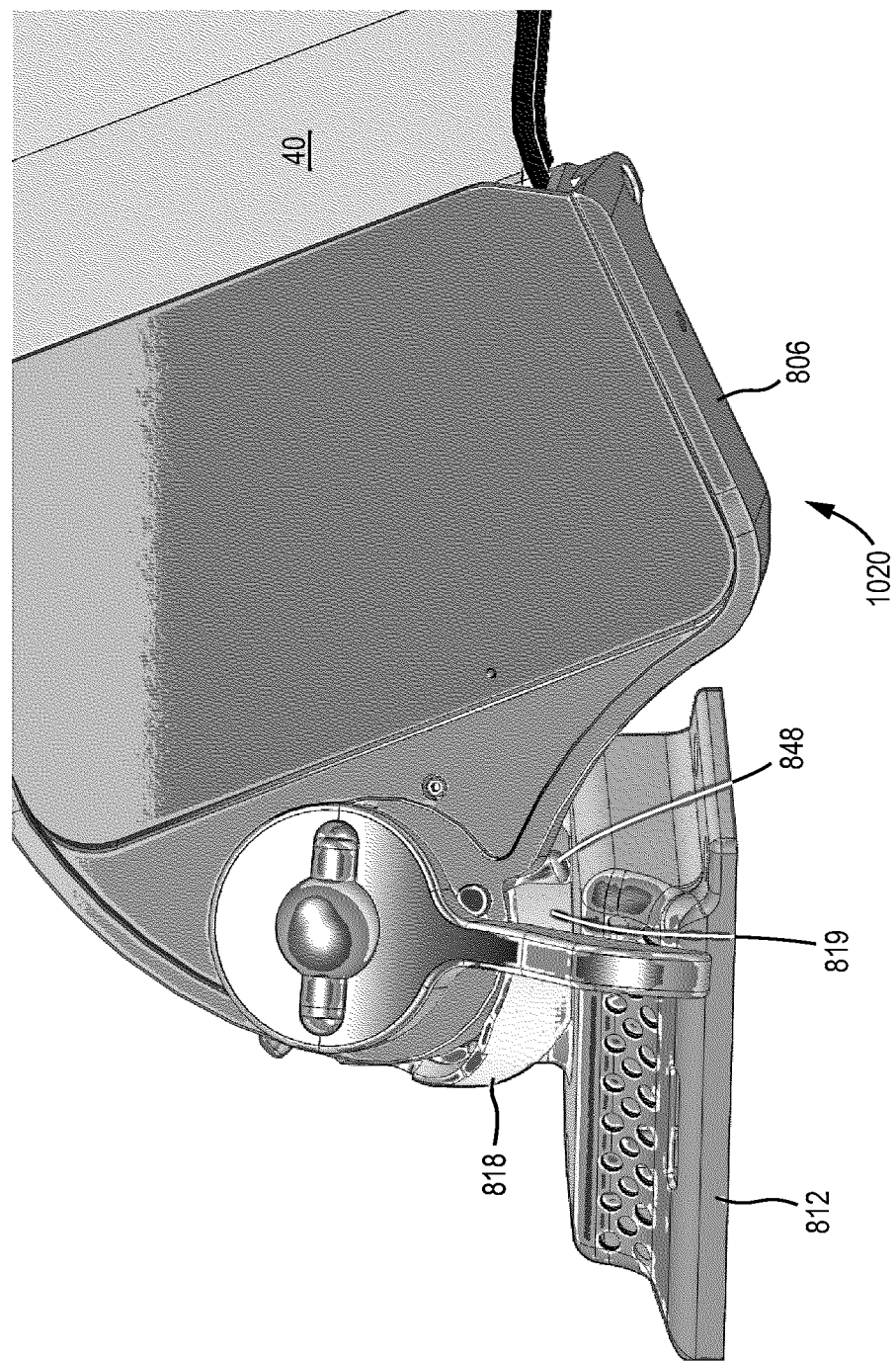
FIG. 7 is another perspective view schematic drawing showing a HUD system including the stow mechanism illustrated in FIG. 1 in a stow position in accordance with another exemplary embodiment.

In operational position 1010, .pin member 848 of collar portion 844 engages operational recess 823 and is against tab 918 to lock mechanism 800 in operational position 1010 (FIG. 6). Bearing 851 also engages operational detent 871 of wedge 804 to prevent wedge 804 from moving. In stow position 1020, pin member 848 engages stow recess 819 to lock mechanism 800 in stow position 1020 (FIG. 7). In stow position 1020, bearing 851 engages stowed detent 873 of wedge 804. Stow position 1020 can be aligned with an aircraft canopy away from the pilot's head.

With reference to FIGS. 10-12, combiner arm 806 travels along stow path 1000 to operational position 1010 from stow position 1020 and from operational position 1010 to stow position 1020. A pilot moves substrate waveguide 40 from stow position 1010 to a position 1012 by turning handle 864 to the up or clockwise. Turning handle 864 clockwise when mechanism 800 is in operational position 1010 causes wedge 804 to turn, thereby, moving waveguide 40 to position 1012.

Position 1012 places waveguide 40 away from the collimator optics and image source (not shown in FIG. 5) so that waveguide 40 can be rotated without engaging the combiner housing for the optics and image source. Rotating handle 864 slides bearing 851 up, but does not disengage operational detent 871. This forces pin 848 up against tab 918. Rotating handle 864 clockwise when mechanism is in position 1010 moves wedge 804 without turning combiner arm 806. Pin 848 disengages operational recess 823 and allows arm 806 to move counter clockwise past position 1012.

At position 1012, tab 841 (FIG. 3) of wedge 804 engages pin 833 and prevents handle 864 from further turning. At position 1012, detent 845 of wedge 804 engages ball bearing 814 to lock wedge 804 in position. At position 1012, the pilot pushes waveguide 40 or combiner arm 806 to the right or counter-clockwise to reach position 1014. Wedge 804 does not move as arm 806 is moved from position 1012 to position 1014.

As position 1014 is reached, pin 936 on combiner arm 806 engages the end of recess groove 932 on handle 864. As position 1014 is reach bearing 851 engages detent 873 on wedge 804 to prevent arm 806 and glass 40 from falling due to gravity. As the pilot continues to rotate arm 806 and glass 40 counter-clockwise to position 1016, both wedge 804 and handle 864 rotate as well. At position 1016, pin 846 hits tab 918 on cam 818, thereby stopping rotation of combiner arm 806 with respect to cam 818 and bearing 814 engages detent 843 on wedge 804. As handle 864 is continued to be rotated, wedge 804 is rotated and pin 848 is brought into stow recess 819 as combiner arm 806 reaches stow position 1020 in line with the canopy of the cockpit. Final stow position 1020 is determined when tab 841 of wedge 804 contacts pin 831 of cam 818 and bearing 851 engages stow detent 871 of wedge 804.

Travel along stow path from stowed position 1020 to operational position 1010 follows an opposite operation to that described above with respect to travel from operational position 1010 to stowed position 1020.

Twisting handle 864 in a clockwise direction when mechanism 800 is in stow position 1020 moves wedge 804 clockwise causing combiner arm 806 to reach position 1016. Member 848 disengages from stow recess 819. At position 1014, wedge 804 is locked as tab 841 contacts pin 833. Detent 845 engages bearing 814 to lock wedge 804. The pilot can move combiner arm 806 from position 1014 to position 1012 by moving combiner arm to the left or clockwise. Moving combiner arm from position 1014 to 1012 only moves combiner arm 806 and does not move wedge 804. Handle 864 can be twisted counter-clockwise to move combiner arm 806 from position 1012 to 1010. Combiner arm 806 is not rotated. Pin 848 engages operational recess 823 to lock combiner arm 806 in position 1010.

In a breakaway event, substrate waveguide 40 can pivot about pin 904. A spring steel link 905 between pin 904 and pin 906 (FIG. 2) holds substrate waveguide 40 in the appropriate positions for operation and breakaway. A pin 908 is received in a slot 910 formed in spring steel link 905. In the event of a breakaway, the bias of spring steel link 905 is overcome and allows the combiner 40 to rotate about pin 904 towards the front of the aircraft and away from the pilot as pin 908 travels through slot 910. As pin 908 travels passed a threshold, the force of link 905 moves waveguide 40 to a breakaway position away from the path of the pilot's during a breakaway event. Link 905 holds waveguide 40 in the breakaway position until a force is applied to overcome link 905 and pin 908 travels back to a top of slot 910 as waveguide 40 is rotated back to its normal position.

The various components of stow mechanism 800 can be manufactured from various materials. Preferably aluminum is utilized as a material.

Although an exemplary stow path 1000 is described herein, stow path may be changed for particular cockpit architectures without departing from the scope of the invention. For example, changes to wedge 804, collar portion 844, and bracket 802 can modify stow path 1000 for particular air frames or cockpits. In addition, although stow mechanism 800 is described as being operated manually, an automated system using motors, solenoids, etc. could move the HUD system through stow path 1000 without departing from the scope of the invention.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A stow mechanism for a head up display, the stow mechanism comprising:
a bracket for attachment to an environment associated with the head up display; and
a combiner arm rotatably attached to the bracket, wherein the combiner arm rotates in at least two degrees of freedom as the combiner arm is rotated with respect to the bracket from an operational position to a stow position.

2. The stow mechanism of claim 1, wherein the combiner arm rotates in at least three degrees of freedom as the combiner arm is rotated with respect to the bracket from the operational position to the stow position.

3. The stow mechanism of claim 1, further comprising:
a handle; and
a shaft integral with or attached to the handle, the shaft being rotatably coupled to the combiner arm, wherein the combiner arm is rotated from the stow position to the operational position by rotating the handle.

4. The stow mechanism of claim 3, further comprising:
a cylindrical wedge disposed between the combiner arm and the bracket.

5. The stow mechanism of claim 4, wherein the cylindrical wedge is fixed to the shaft.

6. The stow mechanism of claim 5, wherein the combiner arm includes pins and the cylindrical wedge includes detents for engaging the pins.

7. The stow mechanism of claim 4, wherein the combiner arm is not rotated and the cylindrical wedge is rotated from the operational position to a first position between the stow position and the operational position when the handle is rotated.

8. The stow mechanism of claim 4, wherein the combiner arm and the cylindrical wedge is rotated between a first position and a second position when the handle is rotated, the first position being between the operational position and the stow position, and the second position being between the stow position and the first position.

9. The stow mechanism of claim 4, wherein the cylindrical wedge is rotated and the combiner arm is not rotated between a first position and the stow position, the first position being between the stow position and the operational position and being closer to the stow position.

10. The stow mechanism of claim 3, further comprising a spherical bearing receiving the shaft, the spherical bearing being disposed in a cylindrical wedge.

11. A method of stowing a HUD, the method comprising:
rotating a combiner associated with the HUD from an operational position to a first position; and
rotating the combiner associated with the HUD from the first position to a stow position, wherein the combiner travels through at least two degrees of freedom as the combiner is rotated from the operational position to the stow position.

12. The method of claim 11, wherein the combiner is rotated by rotating a handle.

13. The method of claim 12, wherein the handle extends from a plane coplanar with the combiner when the combiner is in the operational position.

14. The method of claim 13, wherein the handle is fixed to a shaft, the shaft being fixed to a wedge through a spherical bearing.

15. The method of claim 11, wherein the stow position is in-line with a ceiling in a cockpit.

16. A head up display, comprising:
a substrate waveguide; and
a stow mechanism including a combiner arm for holding the substrate waveguide in a stow path including an operational position and a stow position, the stow mechanism including a wedge and a shaft for effecting movement of the substrate waveguide in at least two degrees of freedom across the stow path.

17. The system of claim 16, wherein the stow mechanism includes a handle integrated with or attached to the shaft, wherein twisting the handle moves the combiner arm across the stow path.

18. The system of claim 17, the shaft is disposed through a spherical bearing and rotatably attached to a bracket.

19. The system of claim 18, wherein the bracket includes a cam having a ball bearing for engaging a detent in the wedge.

20. The system of claim 17, wherein the combiner arm comprises a cylindrical portion, the cylindrical portion sitting on a surface of the wedge.

\* \* \* \* \*